US005891550A

United States Patent [19]

Tingley

[11] Patent Number: 5,891,550

[45] Date of Patent: Apr. 6, 1999

[54] STRUCTURAL MEMBER WITH INCREASED SHEAR RESISTANCE

[76] Inventor: Daniel A. Tingley, 3310 SW. Willamette Ave., Corvallis, Oreg. 97333

[21] Appl. No.: 675,240

[22] Filed: Jul. 3, 1996

Related U.S. Application Data

[60] Provisional application No. 60/011,118, Feb. 5, 1996.

[51] Int. Cl.[6] .................................................. B32B 7/00

[52] U.S. Cl. .................... 428/120; 52/309.16; 52/309.9; 52/223.8; 52/233; 428/74; 428/105; 428/106; 428/114

[58] Field of Search .................................. 428/120, 105, 428/106, 114, 74; 52/309.16, 309.9, 233, 223.8

[56] References Cited

U.S. PATENT DOCUMENTS

| | | | |
|---|---|---|---|
| 5,388,363 | 2/1995 | Smart | 42/71.01 |
| 5,547,729 | 8/1996 | Tingley | 428/74 |

*Primary Examiner*—Nasser Ahmad
*Attorney, Agent, or Firm*—Stoel Rives LLP

[57] ABSTRACT

A wood structural member for bearing a structural load includes at least one wood segment having a generally radial cross-section is selected and arranged so that the annual rings intersect the horizontal shear stress plane at an angle between thirty and ninety degrees.

6 Claims, 4 Drawing Sheets

AVERAGE ULTIMATE SHEAR STRENGTH VS. SPECIFIC GRAVITY FOR DOUGLAS-FIR

STRUCTURAL MEMBER WITH INCREASED SHEAR RESISTANCE

This application claims the benefit of U.S. Provisional Application No. 60/011,118, filed Feb. 5, 1996.

TECHNICAL FIELD

This invention relates to a wood beam structural member, and more particularly to a wood beam structural member that has increased shear resistance.

BACKGROUND OF THE INVENTION

Beams, trusses, joists and columns are the typical structural members that support the weight or loads of structures, including buildings and bridges. Structural members may be manufactured from a variety of materials, including steel, concrete, and wood, according to the structure design, environment and cost.

Wood is a desirable material for use in many structural members because of its various characteristics, including strength for a given weight, appearance, cyclic load response, and fire resistance. Wood structural members are now typically manufactured from multiple wood segments that are bonded together with their lengths generally aligned, such as in glue-laminated members, solid sawn members and solid sawn web I-beams. These manufactured wood structural members have replaced sawn lumber or timbers because the former has higher design limits resulting from better inspection and manufacturing controls.

Various cutting methods are used to obtain wood segments. One method is known as flat sawing in which a log is sawn along its length to produce the segments. Another method is known as radial sawing in which the segments are obtained by cutting the log into quarters and then cutting each quarter toward the center of the log. Regardless of the method used, each segment has a cross-section with an annual growth ring pattern.

There are generally two types of annual growth ring patterns. The first type is a tangential growth ring pattern in which the annual growth rings intersect the broad surface of the segment at an angle of between zero and thirty degrees. The second type is a radial growth ring pattern in which the annual growth rings intersect the broad surface of the segment at an angle of between thirty and ninety degrees.

After the segments have been cut, they are generally randomly selected for the manufacture of the wood structural member regardless of their annual growth ring pattern. Thus, the wood structural members are composed of randomly placed segments resulting in a random arrangement of annual growth ring patterns. Since segments with a tangential growth ring pattern have different strength characteristics in some applications than segments having a radial growth ring pattern, the structural member may not be capable of withstanding stress produced by an applied load.

One type of stress produced by a load applied to a structural member is shearing stress or shear. Shear is generally defined as the internal force acting along a plane between adjacent parts of a body when two equal forces parallel to the plane act on each part in opposite directions. Shear resists the tendency of one part of the body to slide over the other part. The wood structural member must be capable of bearing the shear stress without excessive strain and particularly without ultimately failing.

Wood structural members are subjected to various types of shear stress which it must resist to prevent excessive strain or failure. Wood structural members most often fail because of horizontal shear stress. Horizontal shear stress acts along a plane perpendicular to the applied load. It is particularly important that the wood structural member be highly resistant to horizontal shear stress. The horizontal shear stress in a wood structural member is highest within about the centermost sixty percent portion of the member. Therefore, it is desirable that the centermost sixty percent portion of the wood structural member be highly resistant to the horizontal shear stress. The horizontal shear stress acting on the structural member outside of its central sixty percent is negligible. Although prior wood structural members are strong and can support a substantial load, such a load over time may cause stress points to develop within the wood structural member and particularly within the centermost segment.

Prior attempts to strengthen wood structural members by the addition of reinforcement panels have been successful. For example, U.S. Pat. No. 5,362,545 describes a glue laminated wood beam with a synthetic reinforcement panel added to the areas of the beam subject to the greatest stress to improve the tensile and compressive strength of the beam. In order to adhere the reinforcement panel to the beam with a non-epoxy adhesive, the surface of the reinforcement panel is treated to cause the synthetic fibers to "hair up." Although this beam does have improved tensile and compressive strength, it requires the additional surface-treated reinforcement panel.

Another example of a reinforced structural member is seen in U.S. Pat. No. 5,498,460 which describes a wood beam with synthetic reinforcements that are positioned in areas of high tensile and compressive stress and adhered to the wood segments. The reinforcements extend approximately three-fifths the length of the beam. The reinforcements are surface-treated to create randomly spaced recesses on their surfaces to facilitate adhesion to the wood segments. The strength of this beam is improved by the addition of the reinforcements.

SUMMARY OF THE INVENTION

It is thus a general object of the invention to provide a wood structural member with increased shear resistance for use to support a load.

Another object is to provide a wood structural member that is less susceptible to shear stress failure.

A further object of the invention is to provide a wood structural member that does not require additional reinforcement panels to increase shear resistance.

Still another object of the invention is to provide a wood structural member that is highly resistant to horizontal shear stress.

A further object of the invention is to provide a wood structural member that is resistant to shear stress within its centermost sixty percent portion.

Yet another object of the invention is to provide a wood structural member that is relatively easy to manufacture by known methods.

The present invention provides a wood structural member with increased resistance to horizontal shear stress. In one embodiment, the wood structural member has multiple wood segments that are bonded together with their lengths generally aligned in which a force is to be applied to the major surface of the segment. The wood segments disposed within the sixty percent central portion of the laminate member have two or more annual growth rings per inch that are generally at an angle of between thirty and ninety degrees with the major surface of the segment. The horizontal shear plane is parallel to the major surface of the segments and generally has an angle of intersection with the annual rings within the same range. It is preferable to select segments with annual rings that intersect the major surface at about ninety degrees so that the annual rings also intersect the horizontal shear plane at about ninety degrees. Thus, it can be said that the radial plane of the wood substantially coincides with the horizontal shear plane. Wood segments having this relationship between the annual growth rings and the horizontal shear plane are said to have a radial cross-section.

In another preferred embodiment, a reinforced wood structural member is provided having an increased resistance to shear stress. In this embodiment, the wood member includes multiple wood segments selected and arranged as discussed above with at least one synthetic reinforcement panel disposed between adjacent wood segments.

In yet another embodiment, a solid sawn web I-beam is provided comprising parallel flanges separated by a central web in which a force is to be applied to a major surface of one of the flanges. The major surface of the web is perpendicular to the major surfaces of the flanges. Thus, the force of the applied load acts on the minor surface of the web. The horizontal shear plane is always perpendicular to the applied load. Thus, in this embodiment the horizontal shear plane is parallel to the minor surface of the web. The web segment has two or more annual growth rings per inch that are generally at an angle of between thirty and ninety degrees with its minor surface and, thus, the horizontal shear plane. Preferably, the annual rings intersect the horizontal shear plane at about ninety degrees so that the radial plane of the wood substantially coincides with the horizontal shear plane. Therefore, it can be said that the web segment has a radial cross-section.

In a further embodiment, a solid sawn member is provided to support a load applied to its major surface. The member has two or more annual growth rings per inch are at an angle of between thirty and ninety degrees with the horizontal shear plane. Preferably, the annual rings intersect the horizontal shear plane at about ninety degrees so that the radial plane of the wood substantially coincides with the horizontal shear plane. Therefore, it can be said that the solid sawn member has a radial cross-section.

Additional objects and advantages of this invention will be apparent from the following detailed description of the preferred embodiments thereof which proceeds with reference to the accompanying drawings.

DETAILED DESCRIPTION OF PREFERRED EMBODIMENT

Figure 1:
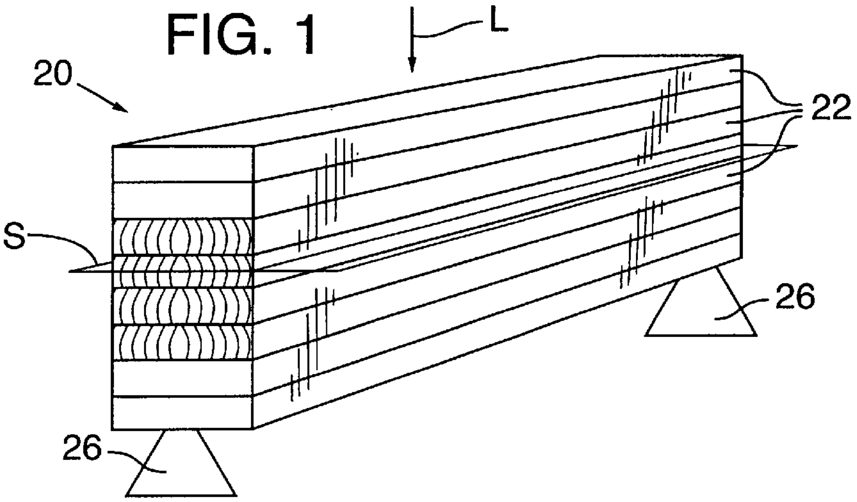
FIG. 1 is a perspective view of a wood structural member embodying this invention having centrally located plural wood segments each having a generally radial cross-section.

FIG. 1 shows a wood structural member 20 having multiple wood segments 22 that are bonded together. Preferably, each segment 22 is an elongate board. Such wood structural members 20 are generally manufactured by forming a stack of randomly selected wood segments 22 with their lengths generally aligned and bonding the major surfaces of the segment together with an adhesive. Although only nine segments are shown, it is to be understood that the structural member 20 could comprise fewer or many more segments of wood.

The structural member 20 may span an open area and support a load as represented by arrow L in FIG. 1. Although only one central load is shown, it is understood by those skilled in the art that the invention encompasses applications in which a load or loads may be applied at various locations along the member 20. The member 20 may be supported by blocks 26 at each end thereof. The load L subjects the member 20 to a horizontal shearing stress that acts along a plane S perpendicular to the load L and is greatest at the center-most portion of the member 20.

Figure 2:
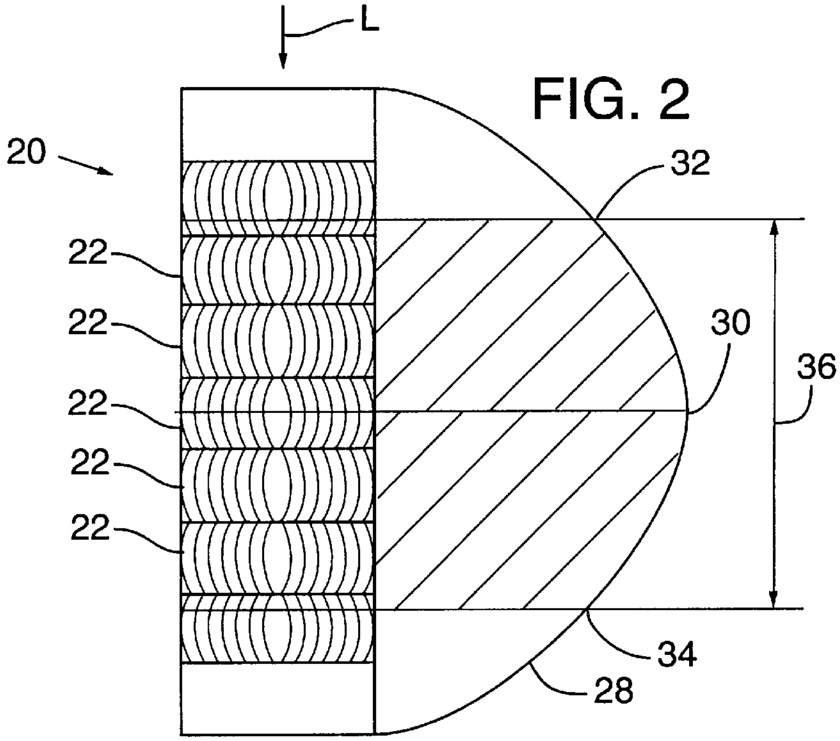
FIG. 2 is an end view of a wood structural member with a characteristic curve illustrating the horizontal shear stress distribution through a wood structural member.

As seen in FIG. 2, the shear stress distribution through the member 20 is represented by a parabolic curve 28. It can be seen that shear stress is at a maximum at the center-most portion of the member 20 represented by position 30 where the curve 28 is greatest. From position 30, the curve 28 lessens only slightly to positions 32 and 34. The area of the curve 28 between positions 32 and 34 represents the portion of the member 20 subject to the highest shear stress. This portion of member 20 is approximately the central sixty percent of the member 20 and is represented by the dimension 36. It is desirable that the member 20 be highly resistant to shear stress throughout its central sixty percent portion.

It has been previously thought that shear strength within a specific species of wood is more dependent on its specific gravity. However, it has been found that within a species of wood, a wood segment having two or more annual rings per inch that intersect the horizontal shear plane resulting from an applied load at an angle of between thirty and ninety degrees are stronger than wood segments that do not. Wood segments having annual rings that intersect the horizontal shear plane at substantially ninety degrees are most resistant to horizontal shear and are preferred. In other words, wood has a higher resistance to horizontal shear stress when the horizontal shear plane substantially coincides with the radial plane of the wood. Wood segments having annual rings with such a relationship to the horizontal shear plane are said to have a radial cross-section.

Figure 3:
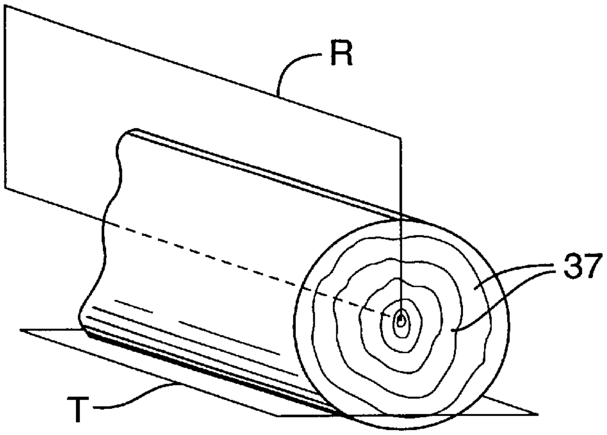
FIG. 3 is a perspective view of a log showing a radial plane and a tangential plane.

Referring now to FIG. 3, it can be seen that wood has a radial plane R that radiates outwardly from the center of the log. Although only one radial plane is shown, it is understood that there are an infinite number of radial planes. Each radial plane is substantially perpendicular to the annual growth rings 37. A tangential plane T is substantially tangent to the growth rings 37.

Figure 4:
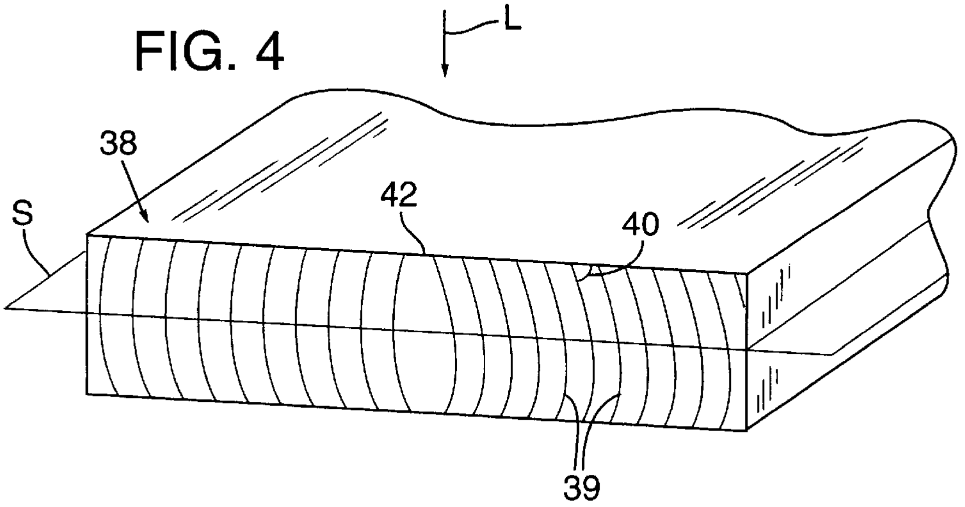
FIG. 4 is a cross-sectional view of a wood segment with a radial cross-section having a load applied to its major surface.

Referring now to FIG. 4, a segment 38 is shown having an annual growth ring pattern in which two or more annual rings per inch 39 generally form an angle 40 of about thirty to ninety degrees with the major surface 42 of the segment 38. If a load L is applied to the major surface 42, shear stress may develop along a horizontal plane S that is substantially perpendicular to the load L. Wood segments having such a growth ring pattern generally have an increased shear capacity in applications where a load is applied to its major surface. This is because the horizontal shear plane intersects the annual rings at an angle of between thirty and ninety degrees. It is preferable to select wood segments having annual rings that intersect the major surface at about ninety degrees so that the horizontal shear plane substantially coincides with the radial plane of the wood.

Therefore, when selecting segments for a wood structural member in which a load is to be applied to its major surface, it is desirable to select segments with two or more annual growth rings per inch that form an angle of between thirty and ninety degrees with its major surface so that the annual rings generally form an angle of about ninety degrees with the horizontal shear plane. It is further desirable to arrange the segments within the central sixty percent portion of the wood structural member.

Figure 5:
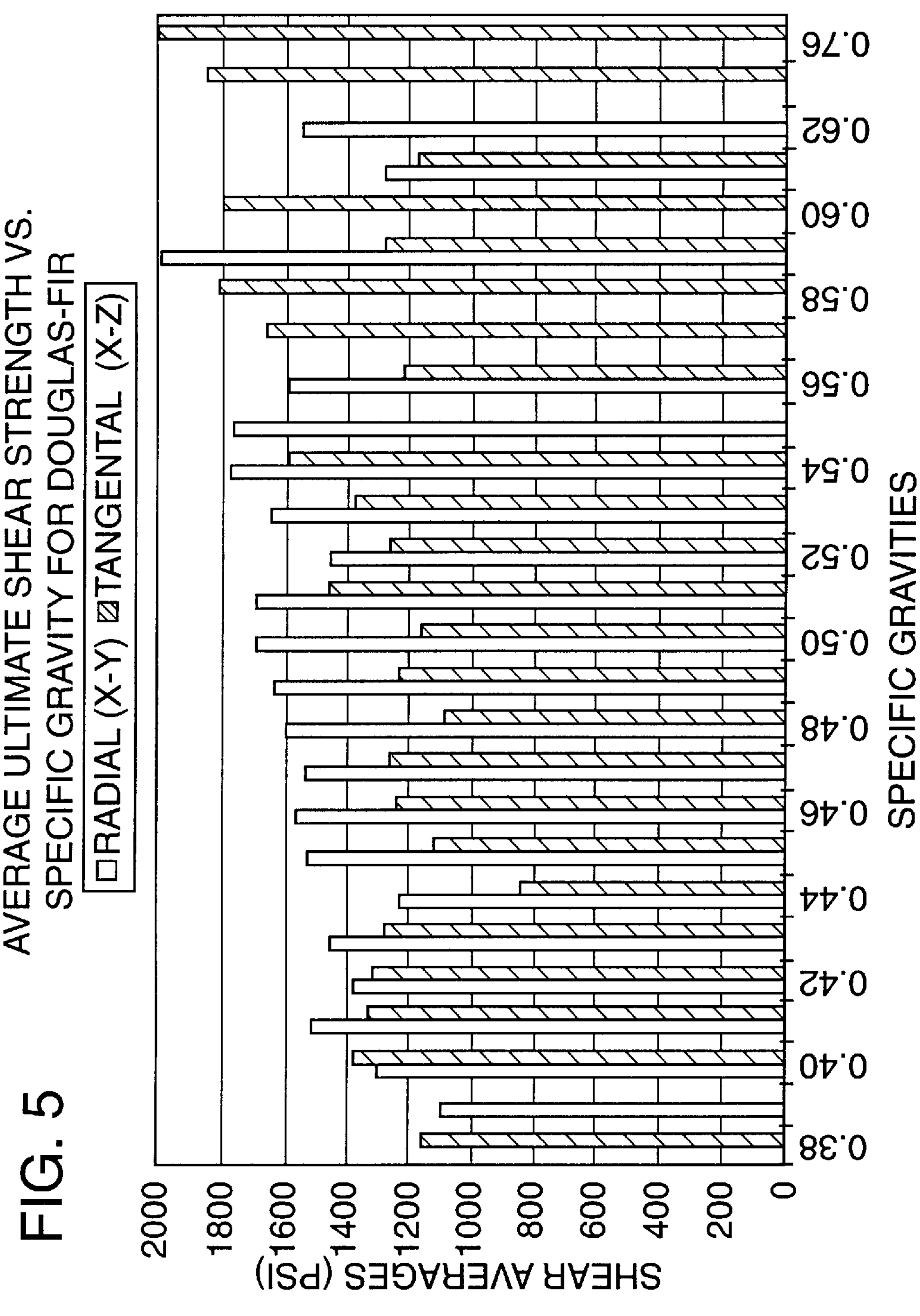
FIG. 5 is a graph showing the average ultimate shear strength vs. specific gravity for Douglas-fir.

FIG. 5 is a graphical representation comparing the average ultimate shear strength vs. specific gravity for Douglas-fir in which the white bar represents segments having a generally radial cross-section in which two or more annual growth rings per inch intersect the horizontal shear plane at an angle of between thirty and ninety degrees. The cross-hatched bar represents segments having a generally tangential cross-section in which the annual growth rings intersect the horizontal shear plane at an angle of between zero and thirty degrees. The wood samples that were tested have specific gravities ranging between 0.38 and 0.76 and were subjected to a load of up to 2000 psi. In most instances, wood within a species having a generally radial cross-section had a significantly higher shear strength than the wood with a generally tangential cross-section. More specifically, in the Douglas-fir wood, samples with a radial cross-section having a specific gravity in the range between 0.41 and 0.61 have greater shear strength than those with a tangential cross-section at the same specific gravity. The most significant difference between the shear strength of wood having a radial cross-section and the shear strength of wood having a tangential cross-section can be seen at the specific gravity of about 0.59. Radially cross-sectioned wood with a specific gravity of 0.59 has a shear average of about 2000 psi. On the other hand, tangentially cross-sectioned wood has a shear average of about just over 1200 psi.

Figure 6:
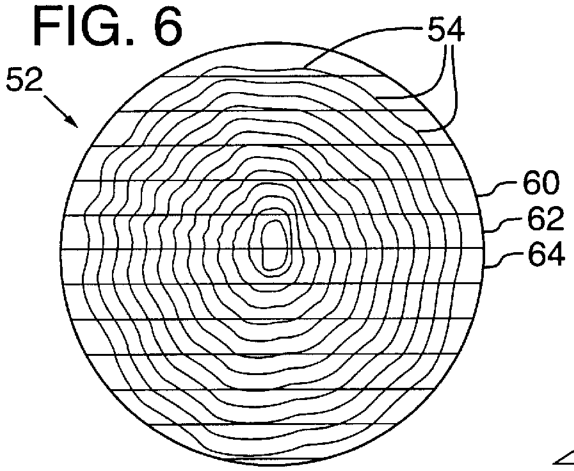
FIG. 6 is a cross-sectional view of a log that has been "flat sawn" or "sawn through."
Figure 7:
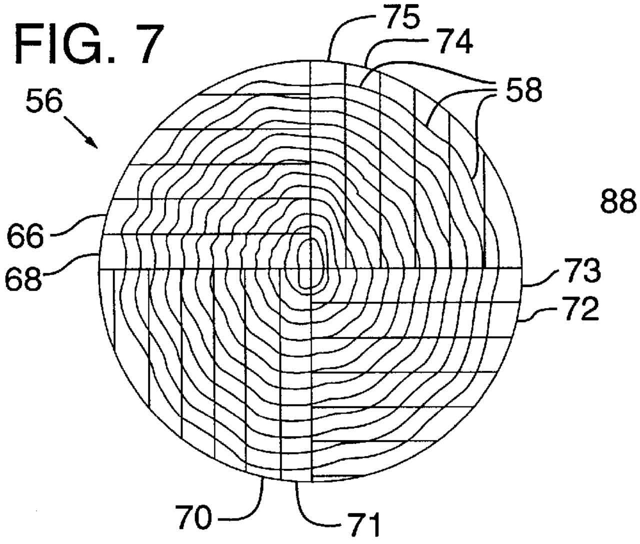
FIG. 7 is a cross-sectional view of a log that has been radially sawn.

The wood segment 22 can be cut from a log in two distinct ways as seen in FIGS. 6 and 7. Referring to FIG. 6, a log 52 can be sawn with cuts taken tangentially to the annual growth rings 54 along the length of the log producing flat sawn lumber. Another way to cut the log is shown in FIG. 7 with cuts taken radially to the annual growth rings 58 toward the center of the log producing radially sawn lumber.

Typically, as seen in FIG. 6, most of the segments obtained from the flat sawn method have a tangential annual growth ring pattern in which the annual rings form an angle of between zero and thirty degrees with the major surface of the segment. If a load is applied to its major surface, shear stress may develop within a plane perpendicular to the load. The annual rings will intersect the horizontal shear plane at an angle of between zero and thirty degrees and the segment may not be able to withstand the force of the applied load. Thus, these segments would not be suitable for use in which a load is applied to its major face.

In the flat sawn lumber of FIG. 6, only the central segments are suitable for such use. For example, only the segments 60, 62, 64 taken from the central portion of the log 56 have the desired growth ring pattern suitable for use in which a load is to be applied to its major face. However, as seen in FIG. 7, the log 56 that has been radially sawn produces more desirable segments 66, 68, 70, 71, 72, 73, 74, 75, 76 with the preferred annual growth ring pattern for such use.

In other words, a log that has been flat sawn usually produces fewer desired segments for such use; whereas, a log that has been radially sawn produces more segments having the desired annual growth ring pattern. Therefore, when selecting segments in which the load is to be applied to its major surface, it is preferable to obtain the segment by radially sawing the log from which the segment is taken. However, segments may be obtained from either method.

During manufacture of the member 20, wood segments 22 are successively aligned with and set against each other in a stack that may be oriented vertically or horizontally. Alignment of the wood segments in a conventional structural wood member is typically achieved by aligning the sides of adjacent wood segments. Typically, the load L is applied to the major face of the member 20 as seen in FIG. 1. The load L may develop shear stress within a plane S that is substantially perpendicular to the load. Preferably, only segments having two or more growth rings per inch that intersect the major surface at an angle of between thirty and ninety degrees are selected and arranged to comprise the central sixty percent portion of the member 20. Preferably, the wood segments are selected and arranged so that the annual rings intersect the horizontal shear plane at about ninety degrees so that the horizontal shear plane substantially coincides with the radial plane of the wood.

Figure 8:
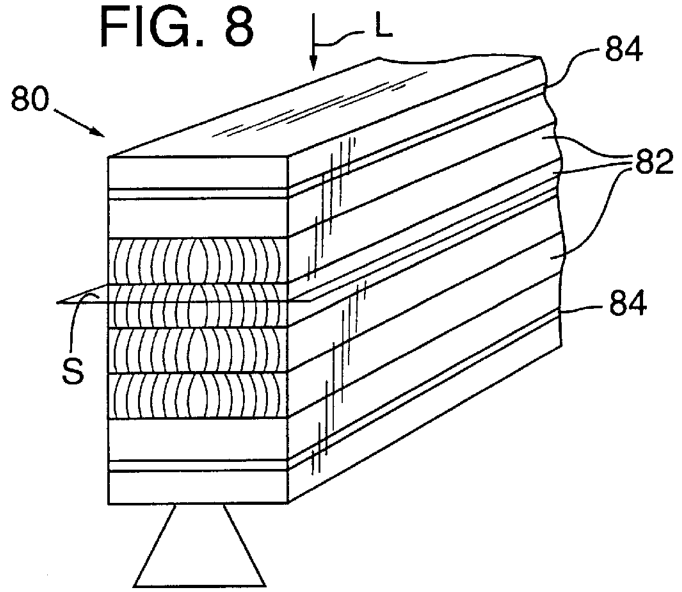
FIG. 8 is a perspective view of a wood structural member similar to that shown in FIG. 1 and having at least one reinforcement panel located near the outside surface of the wood structural member.

As shown in FIG. 8, it is to be understood that this invention also encompasses a reinforced wood structural member 80 having multiple wood segments 82 that are bonded together with reinforcement panels 84 located near the outermost surfaces of the member 80. It can be seen that the load L creates shear stress within a horizontal plane S that is perpendicular to the load. Preferably, the central sixty percent portion of the member 80 includes segments having a generally radial cross-section. It is important that the segments are located adjacent to the reinforcements because there is an increased stress between the wood and reinforcement interface zone. This zone encompasses two or three segments adjacent the reinforcements. Preferably, the annual rings intersect the horizontal shear plane at about ninety degrees so that the horizontal shear plane substantially coincides with the radial plane of the wood.

Figure 9:
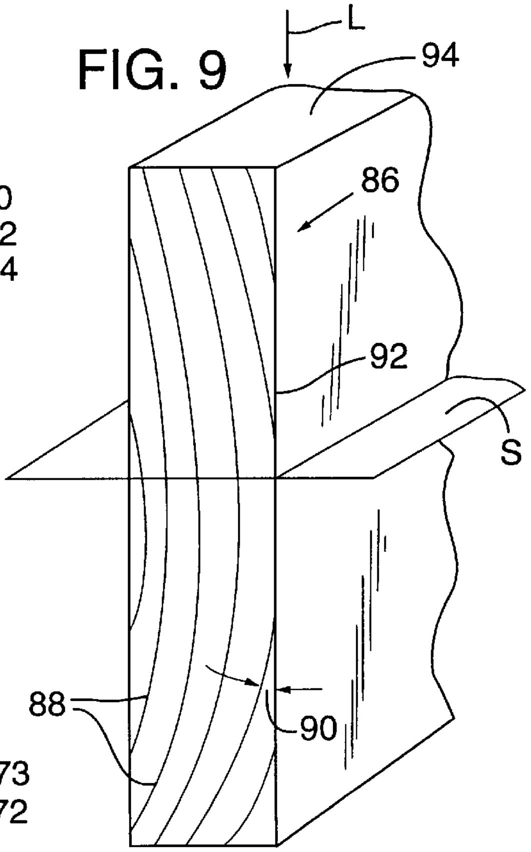
FIG. 9 is a cross-sectional view of a wood segment with a radial cross-section having a load applied to its minor surface.

It is sometimes desirable to use a wood segment in which a load is to be applied to its minor surface. As seen in FIG. 9, a segment 86 is shown having a tangential annual growth ring pattern in which the annual rings 88 generally form an angle 90 of about zero to thirty degrees with the major surface 92 of the segment 86. Even though the segment has a tangential annual growth ring pattern, it is said to have a radial cross-section. This is because the load is applied to its minor surface which develops a horizontal shear plane S perpendicular to the load L. Thus, the horizontal shear plane S intersects the annual rings at an angle of between thirty and ninety degrees. Preferably, the segment has an annular ring pattern where two or more annual rings per inch intersect the shear plane S at an angle of between thirty and ninety degrees. It is preferred that the annual rings meet the shear plane S at an angle of about 90 degrees so that the shear plane coincides with the radial plane of the wood.

Figure 10:
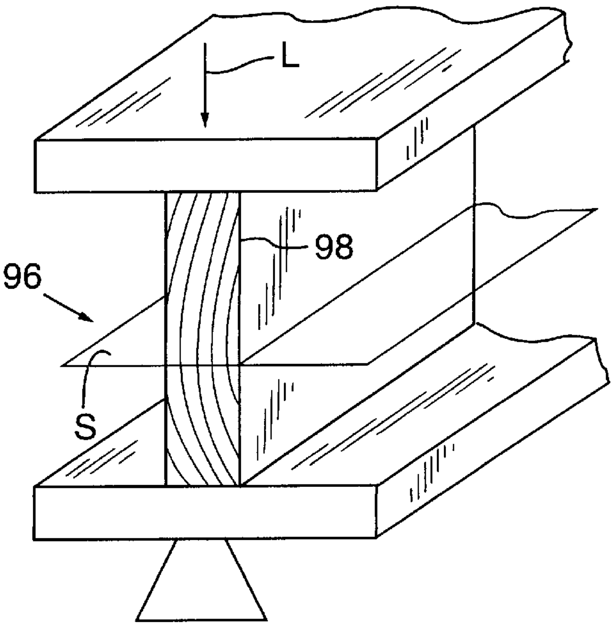
FIG. 10 is a perspective view of a solid sawn web I-beam where the web comprises a wood segment having a generally radial cross-section.

As seen in FIG. 10, such a segment as described above may be employed in a web I-beam member 96 shown with a load L applied to create shear in a horizontal plane S that is perpendicular to the load L and that coincides with the radial plane of the wood. The center web member 98 includes a solid sawn wood segment selected and arranged to have a generally radial cross-section.

Figure 11:
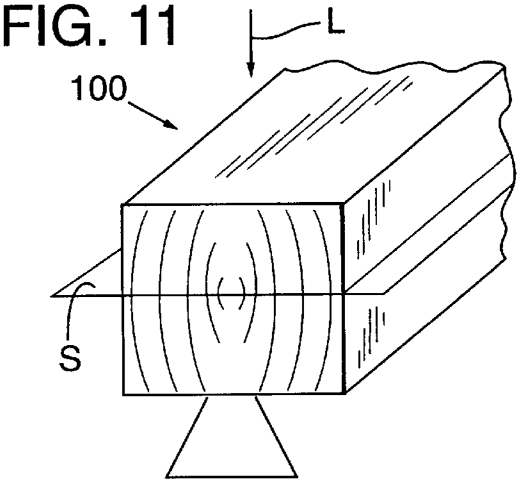
FIG. 11 is a perspective view of a solid sawn member having a generally radial section.

FIG. 11 shows a solid sawn structural member 100 having a generally radial cross-section with a load L applied creating horizontal shear stress within plane S that is perpendicular to load L and that coincides with the radial plane of the wood.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A wood I-beam for bearing an applied load corresponding to shearing stresses that act within a horizontal shear plane substantially perpendicular to the applied load, comprising:

first and second flanges each having a major surface and connected by a transverse wood web segment, wherein the wood segment has a minor surface substantially parallel to the major surface of the first and second flanges and annual rings that intersect the minor surface at an angle between thirty and ninety degrees.

2. A wood laminate structural member supported between supports located at its opposite ends to span an open area for bearing an applied load corresponding to shearing stresses that act within a horizontal shear plane substantially perpendicular to the applied load, comprising:

plural elongate wood segments each having a major surface for bearing the applied load between the supports and secured together in a stack with their lengths generally aligned with the longitudinal axis of the wood structural member wherein the plural wood segments located centrally of the wood structural member have two or more annual growth rings per inch that intersect the major surface at an angle of between thirty and ninety degrees to provide increased resistance to horizontal shear stresses.

3. The elongate wood laminate structural member of claim 2 wherein about sixty percent of a centermost portion of the wood structural member includes wood segments having two or more annual growth rings per inch that intersect the major surface at an angle of between thirty and ninety degrees.

4. The elongate wood laminate structural member of claim 2 wherein the centermost wood segment has a radial plane extending substantially perpendicular to the growth rings and is located within the wood segment such that the radial plane substantially coincides with the horizontal shear plane created by the applied load.

5. The elongate wood laminate structural member of claim 2 wherein the horizontal shear plane created by the applied load intersects the growth rings at an angle of between thirty and ninety degrees.

6. The elongate wood laminate structural member of claim 3 further comprising at least one reinforcement panel adhered to at least one of the wood segments located within the central most sixty percent portion of the wood structural member.

* * * * *